Aug. 14, 1962　　　W. D. GEORGE ETAL　　　3,049,620
SCINTILLATION DETECTOR COOLING SYSTEM
Filed Aug. 20, 1959　　　2 Sheets-Sheet 2

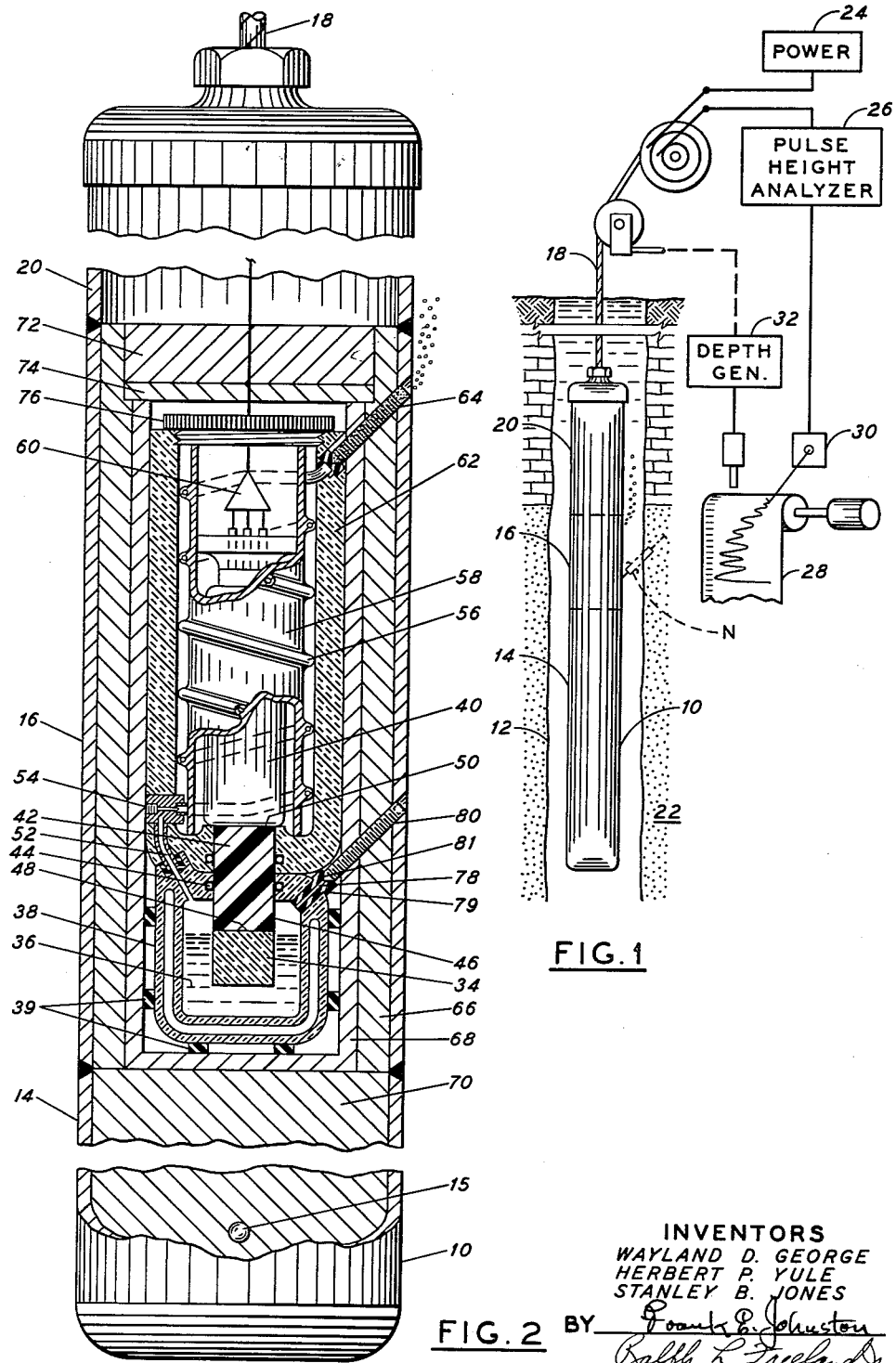

INVENTORS
WAYLAND D. GEORGE
HERBERT P. YULE
STANLEY B. JONES
BY
ATTORNEYS

United States Patent Office
3,049,620
Patented Aug. 14, 1962

3,049,620
SCINTILLATION DETECTOR COOLING SYSTEM
Wayland D. George, Fullerton, Stanley B. Jones, Whittier, and Herbert P. Yule, Anaheim, Calif., assignors to California Research Corporation, San Francisco, Calif., a corporation of Delaware
Filed Aug. 20, 1959, Ser. No. 835,129
6 Claims. (Cl. 250—71.5)

The present invention relates to nuclear spectroscopy well logging apparatus. More particularly, it relates to well logging apparatus wherein nuclear reactions are activated by a neutron source of high intensity, and simultaneously neutron interactions with nuclei in an earth formation generate a profusion of radiations, including instantaneously emitted gamma rays and neutron-scattering interactions.

It is a particular object of the present invention to provide a well logging apparatus in which a higher rate of detection and recording of individual gamma rays can be obtained by use of a scintillation counter that has a decay time for each gamma ray detected therein that is much shorter than heretofore known scintillometers. In accordance with said invention, the individual decay time of each gamma ray scintillation is less than about $3 \times 10^{-8}$ seconds so that a source of increased intensity can be used in the presence of the scintillation detector without an overlapping of the individual gamma ray pulses detected within the crystal. Said scintillation crystal is operated at about liquid nitrogen temperature, and the apparatus includes a scintillation crystal comprising a sodium iodide crystal, unactivated by thallium or other phosphorescent materials, in thermal equilibrium with a reservoir of liquid nitrogen, and said liquid nitrogen is passed through an expansion coil through an expansion valve.

In the investigation of an earth formation as to its chemical constituent by the process known as nuclear spectroscopy, it has been known heretofore to irradiate the formation with fast neutrons, either from a radium-beryllium or polonium-beryllium source and preferably with a fast neutron generator emitting neutrons of approximately 14 mev., such as those produced by the tritium-deuterium reaction process. The gamma rays generated by the interaction of the fast neutrons irradiating the earth formation are then detected by a radiation counter, preferably of the scintillation type, wherein the individual energies of the gamma rays can be measured and their relative abundance recorded as an indication of the chemical constituents of the earth formation. Since only a few of these gamma rays, in fact, are definitive of a particular chemical element, its is necessary to record a vast number of gamma rays in a scintillation detector in order to identify the relative abundance of any one. The relative abundance is a statistical relation to the total number of gamma rays recorded after their detection in the scintillation counter. For a spectrum to be reasonably reliable, it is essential that something like 100,000 gamma rays be detected. While it has been proposed heretofore to use high intensity neutron sources, that is, neutron sources yielding upward of $10^9$ neutrons per second, such intensity has been useful only where heavy shielding is available to prevent the crystal from being overloaded by a large "sea" of low-energy gamma rays. The electronic circuitry that converts each gamma ray intercepted by a crystal into an electrical pulse is rapid enough to handle pulses on the order of $10^7$ and even $10^9$ gamma rays per second. Suitable scintillators with rapid rise and decay times for each gamma ray, or means for utilizing detectors of such characteristic, have not been available for gamma ray spectroscopy work.

In accordance with a preferred form of the present invention, a scintillation counter of sufficiently fast decay time is provided by a scintillation crystal that does not include a phosphorescent material such as thallium that is normally included as an activating agent in sodium iodide. It has been found that sodium iodide, unactivated, has a decay time of about $\frac{1}{40}$ that of NaI(Tl), that is about $3 \times 10^{-8}$ seconds, for each gamma ray intercepted by the crystal. However, such crystals do not scintillate efficiently without activation unless the temperature is maintained at below about that of liquid nitrogen, namely, about $-320°$ F. Accordingly, means are provided for immersing or placing in direct thermal contact a sodium iodide crystal or the like with a reservoir of liquid nitrogen. Since such a liquefied gas boils at a relatively low pressure, it is essential that the reservoir be both thermally insulated and pressurized while in contact with the crystal and said combination is within a well bore having a large hydrostatic pressure externally applied to the logging sonde wherein the apparatus is contained. However, since the temperature of the photomultiplier tube normally coupled to a scintillation crystal cannot operate at such a temperature, namely, about $-320°$ F., the scintillation crystal is separated from the photocathode of the photomultiplier tube by a suitable thermal insulator and light pipe. At the same time, it is essential that the photomultiplier tube be operated at a temperature considerably less than that prevailing in a well bore such as that which is to be logged with the present apparatus. Accordingly, the present invention takes advantage of the necessity for a pressure escape between the liquid nitrogen reservoir and the well bore to form a thermal conductive refrigeration means comprising an expansion coil surrounding and in thermal conductivity to the photomultiplier tube. Control of the release of liquid nitrogen from the reservoir is through an expansion valve. In a preferred form, the liquid nitrogen, now vaporized, is released from the expansion coil through a one-way valve, preferably formed of a porous metal plug having a permeability for gas that is considerably greater than that for liquid.

In an alternative form of the present invention, two different crystals of different sizes and material are placed in a common, liquefied gas reservoir, and the pair of associated photomultiplier tubes are thermally insulated but optically coupled to their respective crystals through light pipes. The expansion valve controls flow of vaporized gas through a pair of expansion coils linked serially between the first photomultiplier tube and the second photomultiplier tube. A gas release mechanism is connected at the end of the second expansion coil.

Further objects and advantages of the present invention will become apparent from the following detailed description taken in conjunction with the accompanying drawings, which form an integral part of the present specification.

In the drawings:

FIG. 1 illustrates a schematic representation of a logging apparatus to which the present invention is addressed;

FIG. 2 is a cross sectional vertical view of a scintillation detection apparatus constructed in accordance with the present invention, wherein a single scintillation counter of unactivated material is immersed in a liquid gas reservoir;

Figure 3:
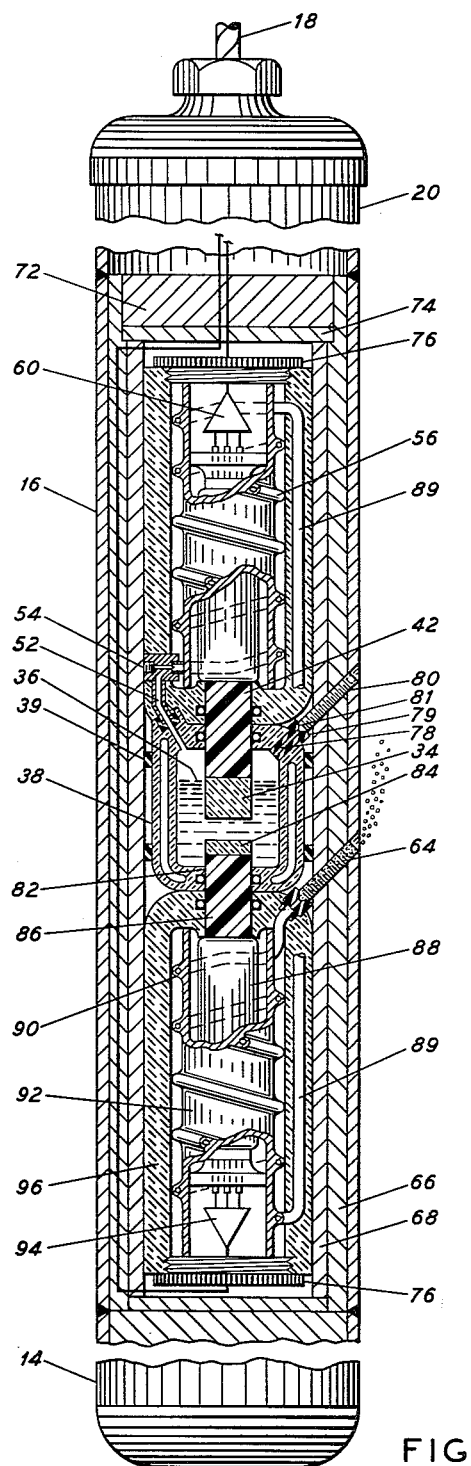
FIG. 3 is an alternative embodiment similar to FIG. 2, wherein a pair of scintillation crystals are in contact with the liquid gas reservoir and the expansion coils are serially connected.

Referring now to the drawings and in particular to FIG. 1 there is illustrated a gamma ray spectroscopy logging apparatus that comprises a logging sonde 10 positioned in a well bore 12. As is typical of such apparatus, the logging sonde includes a neutron source 15 positioned within section 14 of logging sonde 10 and a scintillation detector apparatus positioned within portion 16. The electronic transmission system for converting the output of the scintillation counter to an electrical signal that can be transmitted over logging cable 18 is positioned in section 20 of sonde 10. Operation of the logging sonde to detect the chemical constituents and the representative nuclei in an earth formation such as that designated by the numeral 22 is controlled through the surface recording equipment. This equipment includes a power source 24, a pulse height analyzer 26 wherein the output of the scintillation detector is counted and stored in accordance with the relative energies of the pulses. The output of the pulse height analyzer is recorded on a graph 28 through oscillograph 30. The position of the logging sonde is indicated by depth generator 32 adapted to place marks on graph 28.

As distinguished from previously known logging apparatus of the foregoing type, the present invention is directed to a system for greatly increasing the counting rates of individual gamma rays that can be generated in formation 22 under the influence of a high energy, high flux density source. Neutron source 15 is indicated in FIG. 2 as a capsule of a mixture of neutron generating materials that includes a neutron emitter, such as beryllium and an alpha emitter, such as radium or polonium. However, an electronically controlled neutron generator, such as a Van de Graaff accelerator or a diffusion-type electronic generator of high intensity. But whichever type of generator is positioned in logging sonde 10, its relative position is, as indicated in FIG. 2, close to detector section 16. By so positioning generator section 14 as directly adjacent scintillation counter housing portion 16 as possible, the instantaneously emitted gamma rays either from fast neutron scattering or from thermal neutron capture may be simultaneously detected with the present invention, even though their rates of generation far exceed those usable heretofore. FIG. 2 particularly illustrates a preferred form of scintillation detector apparatus constructed in accordance with the present invention. As there seen, portion 16 comprises a scintillation detector crystal 34 that is desirably of the unactivated type so that gamma rays intercepted and stopped within said crystal do not activate said secondary light-emitting materials, such as thallium, when a gamma ray interacts therewith and at least a portion of its energy surrendered as heat to the crystal. One such satisfactory crystal that we have found is sodium iodide that has not been activated in the usual manner with thallium or other light-emitting phosphors. However, such crystals are not normally efficient light emitters at either the ambient aboveground temperatures or at the elevated temperatures normally encountered in a well bore. Accordingly, to "activate" the crystal so that it will emit light quanta proportional to the energy of the gamma ray intercepted in the crystal, it is essential that the temperature of the crystal be dropped to less than about −100° F. At such operating conditions and temperatures, the decay time of the crystal is of the order of $\frac{1}{10}$ that of the conventional thallium-activated sodium iodide crystals of the type used heretofore. With such a decay time, it is possible to handle a greatly increased number of gamma rays that would normally interfere with each other by a process known as "pile-up." A single gamma ray interacting with the crystals requires a certain finite period to initiate phosphorescence of the light-emitting material, and said phosphorescent material has a finite period of time in which it will continue to fluoresce after activation. If a subsequent gamma ray enters the crystal while this continuing process of fluorescence is occurring and creates further fluorescence, the total number of light quanta generated by a single pulse will have the combined energies of the two pulses together, rather than indicating anything about the individual pulses. For this reason, pile-up is a serious problem in obtaining fast, accurate counting of a large number of gamma rays such as those emitted instantaneously by either the thermal neutron-capture or fast neutron-scatter by nuclei within the earth formation 22.

Since it is essential that crystal 34 be operated at an exceedingly low temperature, that is, about −300° F., such temperature is best obtained by immersing the crystal directly in a bath of liquid nitrogen or other liquefied gas, such as helium, oxygen, methane, or ammonia, designated as 36. To maintain the liquefied gas at the desired temperature over a prolonged period of time, such as that required for a logging sonde, which may require one or more hours in even relatively shallow holes, the liquefied gas is preferably held in a pressurized container means, such as the vacuum or Dewar flask 38. As indicated, flask 38 is desirably formed of glass or other nonconductive material and is further thermally insulated by the air space formed by the flexible cushioning members 39 upon which flask 38 is supported in logging sonde 10.

While, as indicated above, it is essential that crystal 34 be maintained in thermal contact and at a temperature of approximately −300° F., it is equally essential that the photomultiplier tube optically coupled to said crystal, such as tube 40, be thermally isolated from such extreme temperature. One of the primary reasons for this is to prevent the photocathode from become inefficient at such low temperatures. At the same time, it is essential that photomultiplier tube 40 be maintained at a temperature of not over about 100° F. and desirably not over about 50° F. The reason for this is, of course, that the photocathode releases thermal electrons when the tube 40 becomes heated above a relatively low temperature. Such thermal electrons issuing from the photocathode appear to the electrical measuring circuit as gamma rays detected by crystal 34. For each of the foregoing reasons, crystal 34 is isolated from photomultiplier tube 40 by a light pipe 42 which is sealed to pressure container 38 by any suitable means, such as an O-ring 44. Desirably, of course, the light pipe 42 and crystal 34 are surrounded by a reflector 46 of thin material, such as sheet aluminum. Light pipe 42, of course, is optically coupled to crystal 34 and the face of photomultiplier tube 40 by suitable light-transmitting cement at the interfaces designated by 48 and 50, respectively.

Because the photomultiplier tube 40 must be maintained at a reduced temperature, advantage is taken in the present invention of the necessity for releasing pressure from pressure vessel 38 as the liquid nitrogen 36 absorbs heat from crystal 34 and through the vacuum walls of pressure container 38. For this purpose there is provided an escape port or passageway designated generally as 52. Flow through passage 52 is under the control of needle valve 54 which acts as an expansion valve to release gas at a prescribed rate into the expansion coil 56 that surrounds photomultiplier tube 40. In the present embodiment coil 56 is desirably formed on a metal conducting shell 58 that surrounds both photomultiplier tube 40 and the associated preamplifier indicated schematically as 60. Desirably amplifier 60 includes at least one miniature vacuum tube or transistor circuitry whose operating characteristics are improved by thermal isolation from the temperatures encountered under well bore conditions. Desirably, the shell 58 and expansion coil 56 are thermally insulated from well bore temperature conditions by a thermal insulation such as glass, wool, or the like, designated generally by the cylindrical shell 62.

Figure 5:
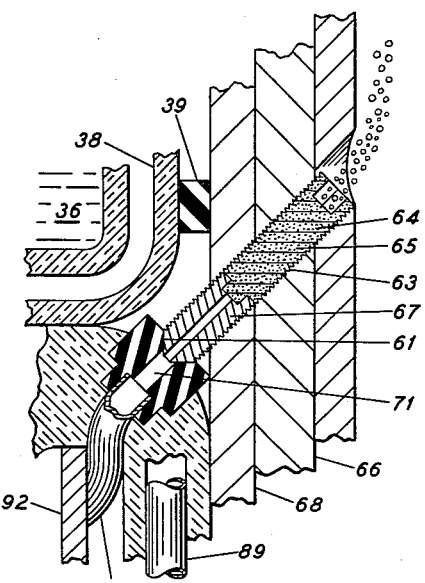
FIG. 5 is a partial vertical sectional view illustrating a preferred construction of the one-way valve for gas release.

Since it is also essential that the gas pressure be prevented from reaching too high a pressure, an escape valve indicated generally as 64 forms a unidirectional port means for release of the gas as it expands after passing through expansion coil 56. In the present embodiment, best seen in FIG. 5 as an enlarged view of the one-way value portion of the embodiment of FIG. 3, this unidirectional port comprises a porous metal portion 65 that screws into enclosing shields 66 and 68 and logging sonde sidewall by threads 63. This plug is desirably formed with a solid portion 67 that includes an interconnecting passageway of such dimension and shape that the flow of gas therethrough and through the permeable section 65 is less impeded than the flow of fluid, particularly mud or drilling fluid. The tapered end 61 seats on a rubber grommet that seals passageways 67 and 71 to the end of tubing 90.

For purposes well understood in the art of detecting gamma radiation by scintillation counters and as particularly disclosed in Patent 2,888,568 to Jones and Meyerhof, issued May 26, 1959, the scintillation crystal and detector are surrounded by shielding material such as that designated by the cylindrical sleeve 66 and the inner cup member 68. As explained in said patent, the outer sleeve 66 is desirably formed of bismuth or the like, while the inner cup 68 is formed of boron or boron carbide. The shielding means directly below the scintillation counter mechanism and within the neutron generator portion 14 of the logging sonde designated as 70 is also formed of bismuth. The cover for the sleeve and cup 66 and 68, respectively, are also desirably formed of similar materials. The cap 72 is bismuth, and the cap 74 is boron. The screw cover 76 which covers the thermal insulator for photomultiplier and first-stage amplifier 60 is indicated as 76.

In the initial operation of the logging tool described hereinbefore, it is, of course, important that the liquefied nitrogen or other gaseous material be added shortly before the start of each run. For this purpose an injection passageway means indicated as 78 may be used by removal of the plug 80 from the injection port. As shown, plug 80 normally seals the end of passageway 78 so that the pressurized container for liquefied gas may be sealed against loss of gas except through the expansion chamber provided by expansion valve 54. In the foregoing way, it is possible to load the liquefied gas refrigerant into the pressurized container without disassembly of the entire logging apparatus. It is to be particularly noted that the passageway 78 is formed through a rubber grommet affair designated generally as 79. Although the passageway 78 is shown to be open, in fact it is desirable that the grommet 79 be formed of a pliant material so that the passageway 78 is normally completely closed by the fluid and semifluid nature of the material from which 79 is made. Thus, the tapered end 81 of plug 80 need not form a tight seal with the grommet 79 in order to form a pressurized container. As a means for loading liquefied nitrogen or other gas 36 into the pressurized container 38, it is accordingly intended that the plug 80 should be removed by unthreading it, or the like, and a hypodermic-type needle inserted through the passageway indicated generally as 78 in grommet 79 and the material transferred under pressure from the outside of the logging sonde. An indication of this type of operation is shown in FIG. 1 where hypodermic needle N is indicated in phantom.

Figure 4:
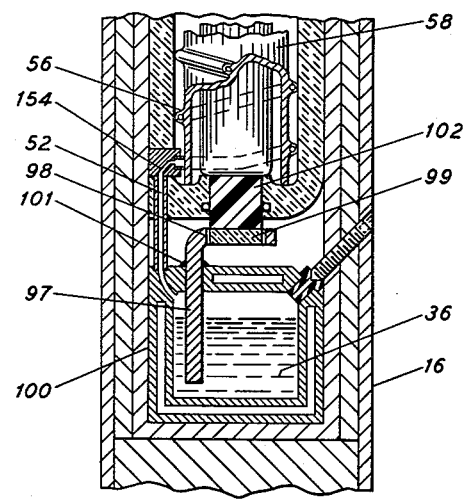
FIG. 4 is an alternative embodiment of a thermally conductive connection between the liquefied gas reservoir and a scintillation crystal wherein the crystal need not be directly immersed in the liquid gas.

FIGS. 3 and 4 illustrate alternative arrangements to that described in connection with FIGS. 1 and 2. In the arrangement of FIG. 3, similar numbers indicate corresponding parts of the apparatus. However, it is to be noted that the pressurized scintillation detector container is so constructed that two scintillation crystals are in thermal contact with the liquefied gas. For this purpose, a passageway or opening 82 is formed in the bottom of the pressurized container, so that scintillation crystal 84, light pipe 86, and photomultiplier tube 88 can be connected. Detector 84 may be made of lithium-iodide (europium-activated) which also increases thermal neutron-detecting efficiency by several times at such low temperatures. As indicated, crystal 84 may be smaller than the corresponding detector 34 when so used. In the present embodiment, instead of releasing the gas after passage through cooling coil 56, the elongated pipe 89 interconnects the gas flow into a second expansion coil 90 that surrounds photomultiplier tube 88. As also indicated in FIG. 3, the expansion coil 90 forms an integral part of the thermally conducting shell 92 that surrounds not only photomultiplier tube 88 but also the first-stage amplifier unit 94. It is to be noted also that a thermal shell 96 also surrounds the expansion coil and that exhaust of the warmed gas after passing through expansion coils 56 and 90 in series relation is permitted to escape into the well bore through porous plug 64 in the same manner as described hereinabove.

FIG. 4 represents a further embodiment of a method of bringing a scintillation crystal into thermal equilibrium at a very low temperature, such as liquefied nitrogen or the like. However, as indicated therein, the crystal itself need not be immersed directly in the liquid nitrogen bath 36, but rather may be brought into thermal contact by a conducting metal bar, such as the L-shaped copper bar 97. As indicated, bar 97 includes a well portion 98 that directly receives a crystal 99 of the same general type indicated by 84 in FIG. 3. The remainder of the structure is similar to that shown in FIGS. 2 and 3, with the exception the pressurized container in the instant case 100 comprises a metal Dewar flask that permits metal bar 97 to be welded, as by weld 101, around the portion of bar 97 where it enters the pressurized container 100. As also indicated, restriction 154 alone in conduit 52 forms the desired expansion valve means.

While not illustrated in detail in the present embodiment, there is sometimes need that a large thermal sink be combined with apparatus of the foregoing type. In such case it is possible to include within the space between thermal shell such as 62 that surrounds the photomultiplier tube 40 and expansion coil 56 a volume of water that can be frozen to ice, so that the temperature surrounding the photomultiplier tube and the first-stage amplifier is about 32° F. The latent heat of melting of ice is, of course, quite high as compared to the latent vapor. Where water or other material having a high thermal capacity is incorporated in the present arrangement, it may be desirable to include a larger storage space for such fluids than that illustrated in the present embodiment, so that a greater reservoir for heat absorption is formed surrounding the photomultiplier tube.

From the foregoing description it will be apparent that there is provided a novel combination of photomultiplier tube and scintillation crystal capable of recording gamma ray spectra at a much higher rate than that possible heretofore in well logging operations. By virtue of the crystal being unactivated by light-emitting phosphors, the decay time for each nuclear event, such as a gamma ray or a neutron detected therein, may be held to a minimum, such as $3 \times 10^{-8}$ seconds. With such crystals it is possible to use the thermal activation produced by reducing the temperature to a low of about —300° F. to sequentially cool the scintillation crystals and through suitable expansion valve means and expansion coil means to cool the scintillation crystal to a higher, but nonetheless lower-than-ambient temperature condition so that erratic behavior caused by thermal emission by the photomultiplier tube does not occur. Further, by the present arrangement, it is possible to cool said crystal and the photomultiplier tube only when the tool is ready for operation within the well bore, and such activation can be undertaken without requiring field disassembly of the entire scintillation counter mechanism.

From the foregoing description it will be apparent that various modifications and changes in the foregoing arrangement can be made without departing from the inventive concept of this invention. All such modifications and changes falling within the scope of the ap-

We claim:

1. Apparatus for increasing the counting rate for gamma radiation in a wellbore which comprises a logging sonde adapted to be positioned in a well bore, means forming a presurized reservoir for storing a liquefied gas at a temperature of less than minus 100° F., a scintillation crystal positioned for thermal contact with said liquefied gas in said reservoir, light pipe means for optically coupling said crystal to a photomultiplier tube and thermally isolating said scintillation crystal from said photomultiplier tube, thermal refrigeration means surrounding said photomultiplier tube, said refrigeration means including an expansion coil in thermal conductivity to said photomultiplier tube, an expansion valve interconnecting said storage reservoir for liquefied gas and said expansion coil, and unidirectional port means for releasing gas expanded in said expansion core to the well bore while preventing flow of drilling fluid into said expansion coil.

2. Apparatus in accordance with claim 1 wherein said crystal is sodium-iodide unactivated by phosphorescent material.

3. Apparatus in accordance with claim 1 wherein a second crystal of different physical characteristics for the detection of gamma rays is positioned within said liquefied gas storage reservoir and is optically coupled to another photomultiplier tube by a second light pipe, said second photomultiplier tube being within a thermal insulator including another expansion coil, said other expansion coil being series connected to the first-named expansion coil around the first said photomultiplier tube, and means for releasing the gas from said other expansion coil directly into the fluid in said well bore through said unidirectional port means.

4. Apparatus in accordance with claim 1 wherein said crystal is placed in thermal conductivity to the liquefied gas by a thermal conductor having one end sealed to contact said liquefied gas in said reservoir.

5. Apparatus in accordance with claim 1 wherein said crystal is directly immersed in the liquefied gas and said light pipe is sealed to the side wall of said liquefied gas reservoir, and means for forming a passageway for injection of liquefied gas into said reservoir from the exterior of said logging sonde without disassembly of said scintillation counter and said gas reservoir.

6. Apparatus for detecting gamma radiation in a well bore when activated by fast neutrons with each gamma ray being detected in a time less than about $3 \times 10^{-8}$ second comprising means forming a logging sonde for positioning a neutron source adjacent said formation, an elongated thermal insulation means for thermally isolating a photomultiplier tube and scintillation crystal from the temperatures of the well bore, said thermal insulation comprising a liquefied gas reservoir surrounding said scintillation crystal and sealed to maintain said gas under a predeterminable pressure, pressure control means for releasing gas under pressure therefrom at a predetermined rate, means forming a light transmission between said scintillation crystal and a photomultiplier tube positioned outside of said liquefied gas reservoir, an expansion coil surrounding said photomultiplier tube and in thermal contact with a thermally conductive medium surrounding said tube, said expansion coil being interconnected with the liquefied gas reservoir through said pressure control means, means for releasing gas pressure from said expansion chamber directly into said well bore through a one-way valve means including a porous metal plug having a high gas permeability and low liquid permeability, and means for injecting liquefied gas into said gas reservoir from the exterior of said logging sonde without disassembly of said logging equipment, whereby the temperature of said scintillation crystal is maintained sufficiently low so that its rise time in generating protons, corresponding to the energy of a gamma ray detected therein, is less than about $3 \times 10^{-8}$ second.

References Cited in the file of this patent

UNITED STATES PATENTS

| | | |
|---|---|---|
| 2,433,554 | Herzog | Dec. 30, 1947 |
| 2,709,753 | Krasnow et al. | May 31, 1955 |
| 2,824,233 | Herzog | Feb. 18, 1958 |
| 2,862,106 | Scherbatskoy | Nov. 25, 1958 |

OTHER REFERENCES

Scintillation Counting, 1956, Nucleonics, vol. 14, No. 4, April 1956, pages 34 to 64.

UNITED STATES PATENT OFFICE
CERTIFICATE OF CORRECTION

Patent No. 3,049,620                               August 14, 1962

Wayland D. George et al.

It is hereby certified that error appears in the above numbered patent requiring correction and that the said Letters Patent should read as corrected below.

Column 1, line 51, for "its" read -- it --; column 3, line 30, after "beryllium" insert a comma; line 33, for "diffusion-type electronic" read -- diffusion generator of the tritium-deuterium type, is preferred as a neutron source --; lines 34 and 35, strike out "generator"; column 5, line 30, strike out "76"; column 6, line 56, for "seconds" read -- second --;' column 7, line 7, for "presurized" read -- pressurized --; line 19, for "core" read -- coil --; line 29, for "second" read -- other --.

Signed and sealed this 29th day of January 1963.

(SEAL)
Attest:

ERNEST W. SWIDER                              DAVID L. LADD
Attesting Officer                               Commissioner of Patents